United States Patent
Ryu et al.

(10) Patent No.: US 11,739,993 B2
(45) Date of Patent: Aug. 29, 2023

(54) HEAT PUMP AND METHOD OF OPERATING HEAT PUMP TO CONTROL POWER TO BOILER BASED ON EXPECTED EFFICIENCY OF HEAT PUMP

(71) Applicant: LG ELECTRONICS INC., Seoul (KR)

(72) Inventors: Jihyeong Ryu, Seoul (KR); Eunjun Cho, Seoul (KR); Minsoo Kim, Seoul (KR); Youngmin Lee, Seoul (KR); Hojin Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 257 days.

(21) Appl. No.: 17/184,156

(22) Filed: Feb. 24, 2021

(65) Prior Publication Data
US 2021/0262709 A1 Aug. 26, 2021

(30) Foreign Application Priority Data
Feb. 25, 2020 (KR) .......................... 10-2020-0023206

(51) Int. Cl.
*F25B 49/02* (2006.01)
*F25B 30/02* (2006.01)
(Continued)

(52) U.S. Cl.
CPC .......... *F25B 30/02* (2013.01); *F24D 19/1006* (2013.01); *F24H 15/16* (2022.01);
(Continued)

(58) Field of Classification Search
CPC ...... F24D 12/02; F24D 17/02; F24D 19/1054; F24D 19/1072; F24D 2200/04;
(Continued)

(56) References Cited

U.S. PATENT DOCUMENTS

| 2012/0029725 A1 | 2/2012 | Lafleur et al. |
| 2013/0248609 A1* | 9/2013 | Aspeslagh .......... F24D 19/1072 237/8 A |
| 2014/0102124 A1 | 4/2014 | Ben-Yaacov et al. |

FOREIGN PATENT DOCUMENTS

| CN | 103180676 | 6/2013 |
| CN | 103370577 | 10/2013 |

(Continued)

OTHER PUBLICATIONS

KR 960010637 (English translation) (Year: 1996).*
(Continued)

*Primary Examiner* — Jonathan Bradford
(74) *Attorney, Agent, or Firm* — KED & Associates LLP

(57) ABSTRACT

A heat pump may include a compressor configured to compress a refrigerant, a first temperature sensor configured to detect an outdoor temperature, a second temperature sensor provided in heating pipes connected to a heating device, and a controller. Based on a first sensing value of the first temperature sensor, the controller may be configured to control a compressor, control power to a boiler, and/or calculate an expected efficiency of the heat pump. Based on the expected efficiency and/or a second sensing value of a second temperature sensor, the controller may be configured to control power to the boiler.

20 Claims, 11 Drawing Sheets

(51) Int. Cl.
*F24H 15/16* (2022.01)
*F24D 19/10* (2006.01)

(52) U.S. Cl.
CPC .... *F25B 49/022* (2013.01); *F25B 2313/0315* (2013.01); *F25B 2313/0316* (2013.01); *F25B 2333/002* (2013.01); *F25B 2333/003* (2013.01)

(58) Field of Classification Search
CPC ............. F24D 2200/123; F25B 30/002; F25B 49/022; F25B 2313/0315; F25B 2313/0316; F25B 2333/002; F25B 2333/003; F25B 2500/19; F25B 2700/2106
See application file for complete search history.

(56) References Cited

FOREIGN PATENT DOCUMENTS

| | | |
|---|---|---|
| CN | 105066236 | 11/2015 |
| CN | 106907859 | 6/2017 |
| CN | 206890817 | 1/2018 |
| EP | 2463591 | 6/2012 |
| EP | 3252382 | 12/2017 |
| JP | 2015-145759 | 8/2015 |

OTHER PUBLICATIONS

German Office Action issued in Application No. 102021201740.1 dated Oct. 7, 2021.
Chinese Office Action dated May 30, 2022 issued in Application No. 202110213184.X (English translation attached).

\* cited by examiner

HEAT PUMP AND METHOD OF OPERATING HEAT PUMP TO CONTROL POWER TO BOILER BASED ON EXPECTED EFFICIENCY OF HEAT PUMP

CROSS-REFERENCE TO RELATED APPLICATION

This application claims priority under 35 U.S.C. § 119 to Korean Application No. 10-2020-0023206, filed in Korea on Feb. 25, 2020, whose entire disclosure is hereby incorporated by reference.

BACKGROUND

1. Field

The present disclosure relates to a heat pump and a method of operating a heat pump.

2. Background

A heat pump is a device that transfers heat from a low temperature source to a high temperature source and vice versa. The heat pump may include an outdoor unit and an indoor unit. The outdoor unit may include a compressor and an outdoor heat exchanger, and the indoor unit may include an expansion valve and an indoor heat exchanger.

The heat pump may be used to heat an indoor space (e.g., by heating indoor air) or to generate hot water, and heating of the air or water may occur through heat exchange of a refrigerant instead of through fossil fuels. When the heat pump is used to provide hot water (i.e., operating as a hot water supply), efficiency of the heat pump and an amount of hot water produced may be rapidly reduced when an outdoor temperature is lowered by a predetermined amount or more (or alternatively decreases to a predetermined temperature or lower). In the related art, when the outdoor temperature is lowered by the predetermined amount or reaches the predetermined temperature, a boiler interlock may be used such that a boiler, instead of or in addition to the heat pump, provides the heat to heat water or the indoor space.

When considering the cost or rate of electric and the gas use, there are cases where using only a boiler or using a heat pump and a boiler together is better than using only a heat pump, even when the outdoor temperature is higher than a predetermined temperature. For example, this is the case when electricity rates are greater than gas rates by a certain or predetermined amount.

In the related art, since only the heat pump may be used when the outdoor temperature is higher than a predetermined temperature and because electric and gas rates may not be considered, a total cost may be increased.

BRIEF DESCRIPTION OF THE DRAWINGS

Embodiments will be described in detail with reference to the following drawings in which like reference numerals refer to like elements, and wherein.

DETAILED DESCRIPTION

Figure 1:
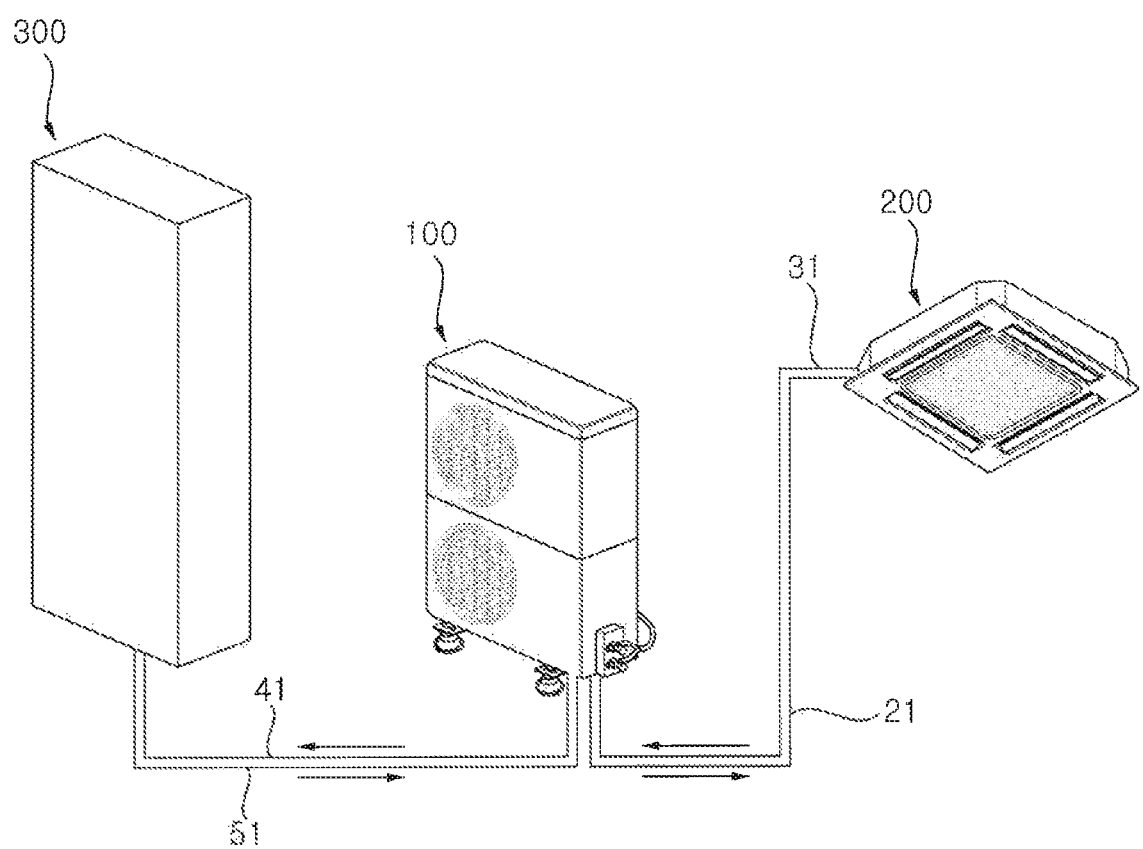
FIG. 1 is a view schematically illustrating a heat pump according to an embodiment of the present disclosure.
Figure 2:
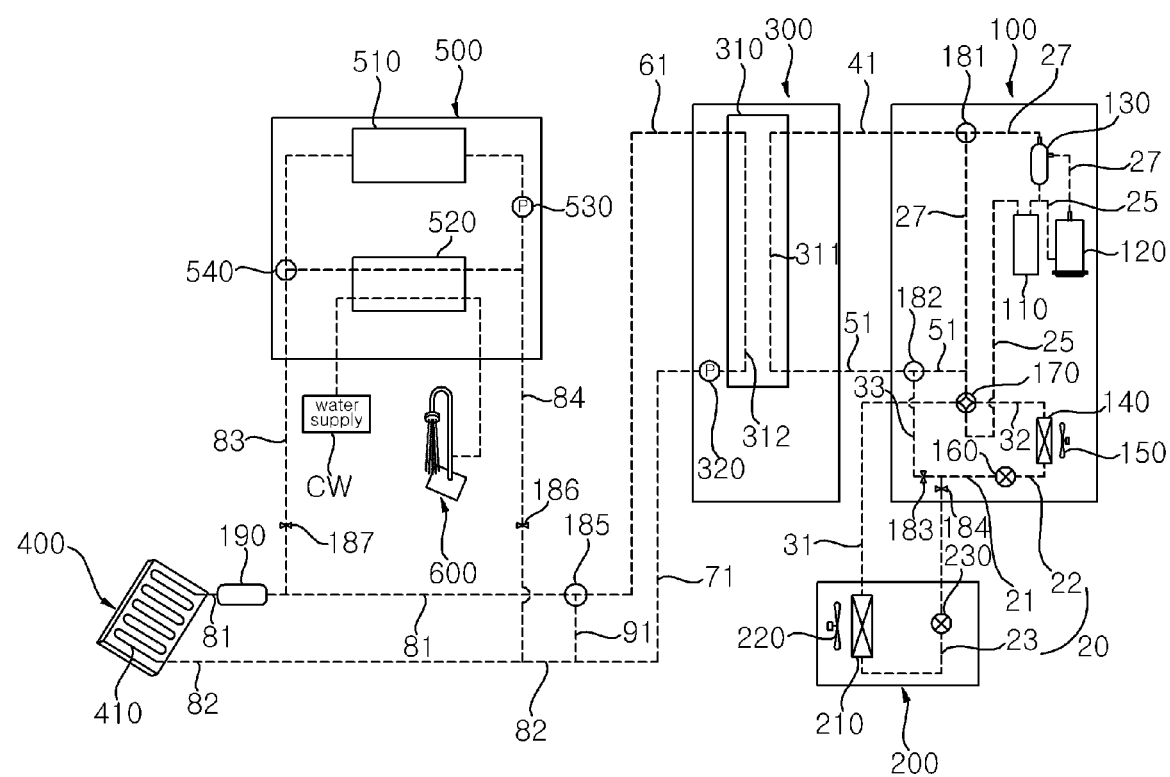
FIG. 2 is a block diagram of a system including a heat pump according to an embodiment of the present disclosure.

Referring to FIGS. 1 and 2, a heat pump 10 may include an outdoor unit 100, an indoor unit 200, and/or a heat exchange device or intermediate heat exchange assembly 300 to exchange heat between compressed refrigerant and water or fluid.

A heat pump system may include the heat pump 10, a heating device or heater 400 and/or a boiler 500 to perform indoor heating. Indoor heating may refer to heating indoor air of an indoor space.

The outdoor unit 100 may include a compressor 120 configured to compress a refrigerant, an accumulator 110 provided in a suction passage 25 of the compressor 120 to prevent liquid refrigerant from flowing into the compressor 120, an oil separator 130 provided in a discharge passage 27 of the compressor 120. The oil separator 130 may separate oil from the refrigerant and oil discharged from the compressor 120, and may recover the separated oil to the compressor 120 and/or a switching valve 170, which may be used to select or change a refrigerant flow path depending on a heating/cooling operation.

The outdoor unit 100 may further include a plurality of sensors, valves, etc. The outdoor unit 100 and the indoor unit 200 may include heat exchangers 140 and 210, respectively, fans 150 and 220, respectively, and/or expansion mechanisms (e.g., expansion valves) 160 and 230, respectively. The fan 150 and expansion mechanism 160 of the outdoor unit 100 may be referred to as an outdoor fan 150 and outdoor expansion mechanism 160. The fan 220 and expansion mechanism 230 of the indoor unit 200 may be referred to as an indoor fan 220 and an indoor expansion mechanism 230.

The outdoor and indoor units 100 and 200 may perform air conditioning to cool indoor air or heating to heat indoor air according to a flow direction of a refrigerant. For example, the indoor unit 200 may receive compressed refrigerant from the outdoor unit 100 and discharge hot air or cold air into the room.

The outdoor heat exchanger 140 may condense or evaporate a refrigerant. The outdoor heat exchanger 140 may be configured as a heat exchanger to perform heat exchange between outdoor air and a refrigerant, or be configured as a heat exchanger to perform heat exchange between cooling water or fluid and a refrigerant.

When the outdoor heat exchanger 140 is configured to heat exchange outdoor air with refrigerant, the outdoor fan 150 may be provided at a side of the outdoor heat exchanger 140 and guide outdoor air to the outdoor heat exchanger 140 to promote heat dissipation of the refrigerant. Hereinafter, a case where the outdoor heat exchanger 140 is configured as an air-refrigerant heat exchanger in which outdoor air and refrigerant are heat exchanged with each other is described as an example.

The outdoor heat exchanger 140 may be connected to the indoor heat exchanger 210 and a heat exchanger connection pipe 20. The expansion mechanisms 160 and 230 may be installed in the heat exchanger connection pipe 20.

The heat exchanger connection pipe 20 may include a first connection pipe 21 to which the outdoor expansion device 160 and the indoor expansion device 230 are connected, a second connection pipe 22 to which the outdoor heat exchanger 140 and the outdoor expansion device 160 are connected, and a third connection pipe 23 to which the indoor heat exchanger 210 and the indoor expansion device 230 are connected. The first connection pipe 21 may alternatively be referred to as an expansion device connection pipe, the second connection pipe 22 may alternatively be referred to as an "outdoor connection pipe" or an "outdoor heat exchanger-outdoor expansion device connection pipe," and the third connection pipe 23 may alternatively be referred to as an "indoor connection pipe" or an "indoor expansion device-indoor heat exchanger connection pipe."

The indoor heat exchanger 210 may be a heat exchanger that cools or heats a room through heat exchange between indoor air and a refrigerant. The indoor fan 220 may be provided at a side of the indoor heat exchanger 210 to guide indoor air to the indoor heat exchanger 210.

In the case of a cooling mode in which the heat pump 10 cools the room through the indoor unit 200, the heat exchanger 210 may function as an evaporator, and the refrigerant compressed by the compressor 120 of the outdoor unit 100 may sequentially pass through the outdoor heat exchanger 140, the expansion mechanisms 160 and 230, the indoor heat exchanger 210, and the compressor 120. In the case of a heating mode in which the heat pump 10 heats the room through the indoor unit 200, the heat exchanger 210 may function as a condenser, and the refrigerant compressed by the compressor 120 of the outdoor unit 100 may sequentially pass through the indoor heat exchanger 210, the expansion mechanisms 160 and 230, the outdoor heat exchanger 140, and the compressor 120.

The switching valve 170 may change a flow direction of the refrigerant so that the refrigerant flows in the order of the compressor 120, the outdoor heat exchanger 140, and the indoor heat exchanger 210, or in the order of the compressor 120, the indoor heat exchanger 210, and the outdoor heat exchanger 210. The switching valve 170 may be connected to the compressor 120 through the compressor suction passage 25 and the compressor discharge passage 27. The switching valve 170 may be connected to the indoor heat exchanger 210 through an indoor heat exchanger connection pipe 31. The switching valve 170 may be connected to the outdoor heat exchanger 140 through an outdoor heat exchanger connection pipe 32.

The outdoor unit 100 may include a refrigerant control valve 181 configured to selectively supply refrigerant from the compressor discharge passage 27 to the heat exchange device 300 or the switching valve 170. When the refrigerant control valve 181 is configured as a three-way valve, the refrigerant control valve 181 may be provided at the compressor discharge passage 27. A heat exchange device supply passage 41 to supply the refrigerant to the heat exchange device 300 may be branched from the refrigerant control valve 181.

The outdoor unit 100 may further include an auxiliary refrigerant control valve 182. The auxiliary refrigerant control valve 182 may operate so that the refrigerant transferred from the heat exchange device 300 to the outdoor unit 100 is supplied to a heat exchanger bypass passage 33 or to the switching valve 170. The refrigerant control valve 181 and the auxiliary refrigerant control valve 182 may alternatively be referred to as first and second refrigerant control valves. The refrigerant control valve 181 and/or the auxiliary refrigerant control valve 183 may be configured as a three-way valve.

The outdoor unit 100 may further include a heat exchanger bypass valve 183 and a liquid refrigerant valve 184. The heat exchanger bypass valve 183 may be provided in the heat exchanger bypass passage 33 to regulate a flow of refrigerant. The liquid refrigerant valve 184 may be provided in a passage between the heat exchanger bypass passage 33 and the indoor expansion mechanism 230 to regulate the flow of the refrigerant.

The heat exchanger bypass valve 183 may be opened during heating. The heat exchanger bypass valve 183 may be closed during cooling or when the heat pump 100 performs a simultaneous air conditioning and heating function during a simultaneous operation. The liquid refrigerant valve 184 may be opened during cooling or during the simultaneous operation, and be closed during heating.

The heat exchange device 300 may receive compressed refrigerant from the outdoor unit 100 through the heat exchange device supply passage 41. The heat exchange device 300 may deliver the refrigerant to the outdoor unit 100 through a heat exchange device recovery passage 51.

The heat exchange device 300 may include a water-refrigerant heat exchanger or intermediate heat exchanger 310 to exchange heat between water or fluid and refrigerant supplied from the outdoor unit 100. The water-refrigerant heat exchanger 310 may be composed of a double tube heat exchanger in which a refrigerant passage 311 and a water passage 312 are formed inside/outside with a heat transfer member interposed therebetween. The water-refrigerant heat exchanger 310 may also be composed of a plate-type heat exchanger in which the refrigerant passage 311 and the water passage 312 are alternately formed with a heat transfer member therebetween. Hereinafter, a case where the water-refrigerant heat exchanger 310 is configured as a plate heat exchanger will be described as an example.

The refrigerant passage 311 of the water-refrigerant heat exchanger 310 may be connected to the heat exchange device supply passage 41 and the heat exchange device recovery passage 51. The refrigerant supplied to the water-refrigerant heat exchanger 310 through the heat exchanger supply passage 41 may be heat-exchanged while flowing through the refrigerant passage 311 and be transferred to the outdoor unit 100 through the heat exchanger recovery passage 51.

The water passage 312 of the water-refrigerant heat exchanger 310 may be connected to a hot-water pipe or water discharge pipe 61 through which water is discharged from the water-refrigerant heat exchanger 310 and a cold-water pipe or water supply pipe 71 through which water is supplied to the water-refrigerant heat exchanger 310. A recovery pump 320 to pump water circulating through the water-refrigerant heat exchanger 310 may be provided in the cold-water pipe 71. The recovery pump 320 may circulate water through the water-refrigerant heat exchanger 310 even when the refrigerant is not supplied from the outdoor unit 100 to the heat exchanger 300 to prevent freezing.

The heating device 400 may include a heat dissipation tube 410, and heat an indoor space (e.g., an indoor floor or wall) using hot water flowing along the heat dissipation tube 410. The heating device 400 may be connected to a heating supply pipe 81 and a heating recovery pipe 82.

Water supplied through the heating supply pipe 81 may be heat-exchanged while flowing through the heat dissipation pipe 410, and be discharged through the heating recovery pipe 82. The heating supply pipe 81, the heat dissipation pipe 410, and the heating recovery pipe 82 may collectively be referred to as heating pipes. The heating supply pipe 81 may be connected to the hot-water pipe 61, and the heating recovery pipe 82 may be connected to the cold-water pipe 71.

The heat pump 10 may further include a temperature sensor 190 provided in the heating pipes and detect a temperature of water flowing through the heating pipes 81, 410, and 82. For example, the temperature sensor 190 may be provided in the heating supply pipe 81 among the heating pipes 81, 410, and 82 to detect the temperature of water supplied to the heating device 400.

A hot water supply control valve 185 may be provided between or connect the heating supply pipe 81 and the hot-water pipe 61. When the hot water supply control valve 185 is opened, water may flow from the hot-water pipe 61 to the heating supply pipe 81. When the hot water supply control valve 185 is closed, the flow of water between the hot-water pipe 61 and the heating supply pipe 81 may be blocked, so that water may not flow from the hot-water pipe 61 to the heating supply pipe 81.

When the hot water supply control valve 185 is configured as a three-way valve, the hot water supply control valve 185 may be connected to a bypass pipe 91, which may be connected to the cold-water pipe 71. Water may flow from the hot-water pipe 61 to the cold-water pipe 71 when the hot water supply control valve 185 is closed.

The boiler 500 may include a combustion heating unit or combustor 510 that heats water by burning fossil fuels and may also include a boiler heat exchange device or boiler heat exchanger 520 to exchange heat between water heated by the combustion heating unit 510 and water supplied from a water supply CW. When the boiler 500 provides hot water, the boiler 500 may heat water through the combustion heating unit 510 and transfer the heated water to the boiler heat exchange device 520, and water supplied from the water supply CW may be heated through heat exchange with water heated by the combustion heating unit 510 and then supplied to a hot water supply device or dispenser 600 (e.g., a faucet, spicket, or shower head).

As an alternative, the fluid flowing through the heating device 400, the hot water pipe 61, the water supply pipe 71, the heating supply pipe 81, the heating recovery pipe 82, etc. may be a refrigerant, in which case, such refrigerant may be referred to as a first refrigerant, while the refrigerant flowing through indoor unit 200, outdoor unit 200, etc. may be referred to as a second refrigerant. In such a case, the boiler heat exchange device 520 may be a water-refrigerant heat exchanger implemented as a plate-type heat exchanger or double tube heat exchanger so that the first refrigerant may be heat exchanged with the water supplied from the water supply CW. Once heated, the water may be supplied to the user via the hot water supply device 600.

The boiler 500 may further include a boiler pump 530 that pumps water or fluid circulating through the boiler 500. The boiler 500 may further include a boiler bypass valve 540, which may be configured as a three-way valve.

When the boiler 500 provides a heating function to heat an indoor space, the boiler bypass valve 540 may be controlled so that water heated by the combustion heating unit 510 flows through the boiler supply pipe 83. When the boiler 500 provides a hot water supply function to heat water ultimately supplied through the hot water supply device 600, the boiler bypass valve 540 may operate to transfer water heated by the combustion heating unit 510 to the boiler heat exchange device 520.

The boiler 500 may be connected to the heating supply pipe 81 and the heating recovery pipe 82 through the boiler supply pipe 83 and a boiler recovery pipe 84. Water heated in the boiler 500 may flow to the heating supply pipe 81 through the boiler supply pipe 83, and water discharged from the heating device 400 to the heating recovery pipe 82 may flow to the boiler 500 through the boiler recovery pipe 84.

The heat pump 10 may further include a boiler return valve 186 provided in the boiler recovery pipe 84 to regulate a flow of water. For example, when the boiler 500 does not operate and the heat pump 10 provides a heating function to heat an indoor space, the boiler return valve 186 may be turned off, closed, and/or configured to block a flow of water flowing from the heating recovery pipe 82 to the boiler 500. When the boiler 500 provides the heating function, the boiler return valve 186 may be turned on or be opened, and water discharged from the heating device 400 to the heating recovery pipe 82 may be transferred to the boiler 500.

The heat pump 10 may further include a boiler supply valve 187 provided in the boiler supply pipe 83 to regulate the flow of water. For example, when the boiler 500 provides the heating function, the boiler supply valve 187 may be opened so that water heated in the boiler 500 flows to the heating supply pipe 81 through the boiler supply pipe 83.

An amount of water flowing through the boiler supply pipe 83 may be adjusted according to a degree to which the boiler supply valve 187 is opened. The degree to which the boiler supply valve 187 is opened may be controlled according to a pulse value input to the boiler supply valve 187. For example, when two pulses are input to the boiler supply valve 187, the degree to which the boiler supply valve 187 is opened may be controlled to have a value of two or corresponding to two.

The heat pump 10 may control the boiler 500 to be turned on or turned off.

The heat pump 10 may turn on or off the boiler 500 without communicating directly with the boiler 500. For example, the heat pump 10 may transmit a signal to a component (e.g. a switch) that transmits a power signal to the boiler 500 to turn the boiler 500 on or off.

Even when the boiler 500 is turned off by the heat pump 10, the boiler 500 may be turned on when the user requests the use of hot water (e.g., by turning a faucet and/or the hot water supply device 600 on), and the boiler 500 may supply hot water to the hot water supply device 600 by using the water heated via the boiler heat exchange device 520.

Figure 3:
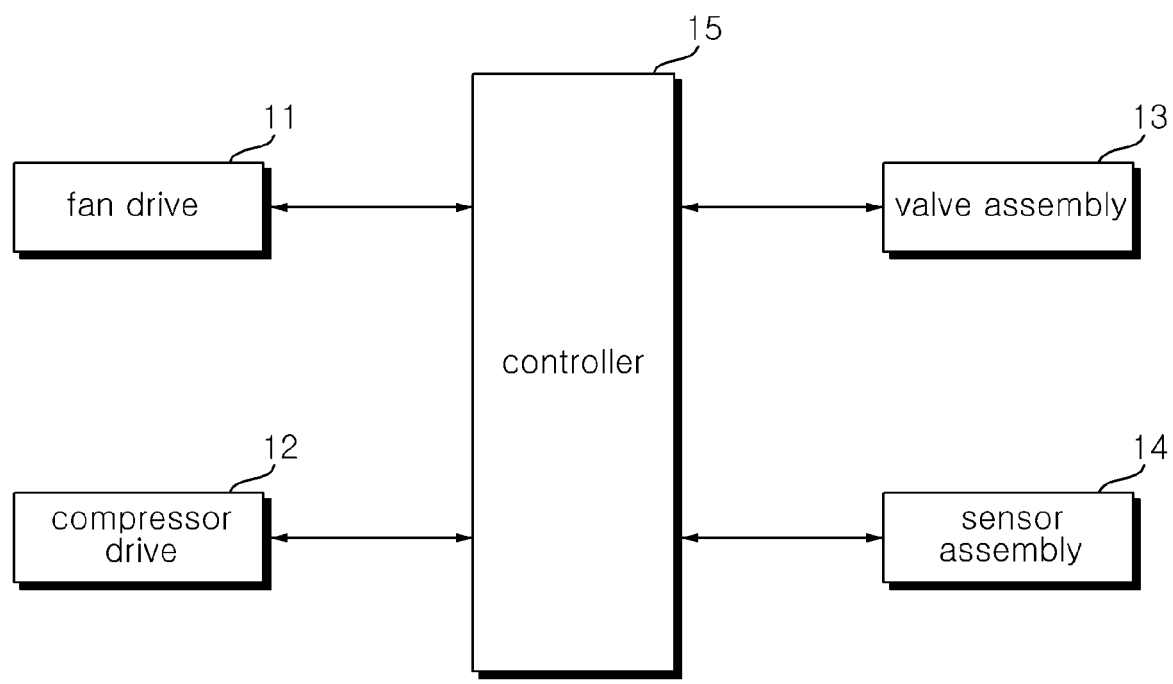
FIG. 3 is a block diagram of a heat pump according to an embodiment of the present disclosure.

Referring to FIG. 3, the heat pump 10 may include a fan drive 11, a compressor drive 12, a valve assembly 13, a sensor assembly 14, and/or a controller 15. The fan drive 11 may drive at least one fan included in the heat pump 10 (e.g., the indoor fan and/or outdoor fan 220 and/or 150). The fan drive 11 may include a rectifier that rectifies and outputs alternating current (AC) power to direct current (DC) power, a dc capacitor that stores a pulsating voltage from the rectifier, an inverter that includes a plurality of switching elements and converts DC power to 3-phase AC power at a predetermined frequency, and/or a motor that drives the fans 150 and 230 according to the 3-phase AC power output from the inverter. The fan drive 11 may include components to drive the outdoor fan 150 and the indoor fan 220, respectively.

The compressor drive 12 may drive the compressor 120. The compressor drive 12 may include a rectifier that rectifies and outputs AC power to DC power, a dc capacitor that stores a pulsating voltage from the rectifier, an inverter that includes a plurality of switching elements and converts DC power to 3-phase AC power at a predetermined frequency, and/or a compressor motor that drives the compressor 120 according to the three-phase AC power output from the inverter.

The valve assembly 13 may include at least one valve (e.g., the switching valve 170, the auxiliary refrigerant control valve 182, the heat exchanger bypass valve 183, the liquid refrigerant valve 184, the hot water supply control valve 185, and/or the boiler valve 186). At least one valve included in the valve assembly 13 may operate under the control of the controller 15.

The sensor assembly 14 may include at least one sensor and transmit data on a sensing value sensed through at least one sensor to the controller 15. At least one sensor included in the sensor assembly 14 may be provided inside the outdoor unit 100 and/or the indoor unit 200. For example, the sensor assembly 14 may include a heat exchanger temperature sensor provided inside the outdoor heat exchanger 140 to detect a condensation temperature or an evaporation temperature, a pressure sensor to detect a pressure of gaseous refrigerant flowing through each pipe, and/or a pipe temperature sensor to detect a temperature of a fluid flowing through each pipe.

The sensor assembly 14 may include an indoor temperature sensor to detect an indoor temperature and/or an outdoor temperature sensor to detect an outdoor temperature. For example, the outdoor temperature sensor may be provided in the outdoor unit 100, and the indoor temperature sensor may be provided in the indoor unit 200. The sensor assembly 14 may also include the temperature sensor 190 provided in the heating pipes connected to the heating device 400 to detect a temperature of water flowing through the heating pipes.

The sensor assembly 14 may include a cold-water pipe temperature sensor provided in the cold-water pipe 71 to detect the temperature of water flowing into the water-refrigerant heat exchanger 310 of the heat exchange device 300. The sensor assembly 14 may also include a heat exchanger temperature sensor provided inside the outdoor heat exchanger 140 to detect the temperature of the outdoor heat exchanger 140.

The controller 15 may be connected to each component or device (e.g., sensors of the sensor assembly 14, valves of the valve assembly 13, fan drive 11, and compressor drive 12) included in the heat pump 10 and control an overall operation of each component. The controller 15 may transmit and receive data between components included in the heat pump 10. The controller 15 may be provided in at least one of the indoor unit 200, the heat exchange device 300, and/or the outdoor unit 100.

The controller 15 may include at least one processor to control the overall operation of the heat pump 10. The processor may be a general processor such as a central processing unit (CPU). The processor may be a dedicated device such as an application-specific integrated circuit (ASIC) or another hardware-based processor.

The controller 15 may control the operation of the fan drive 11. For example, the controller 15 may change a rotation speed of the outdoor and indoor fans 150 and 230 by changing a frequency of the three-phase AC power output to the outdoor fan motor through operation control of the fan drive 11.

The controller 15 may control the operation of the compressor drive 12. For example, the controller 15 may change an operating frequency of the compressor 120 by changing a frequency of the three-phase AC power output to the compressor motor through operation control of the compressor drive 12.

The controller 15 may control an operation of at least one valve included in the valve assembly 13 according to a function provided by the heat pump 10. For example, when the heat pump 10 provides a heating function, the controller 15 may control the heat exchanger bypass valve 183 to be opened, and control the liquid refrigerant valve 184 to be closed. When the heat pump 10 does not provide the heating function, the controller 15 may control the hot water supply control valve 185 to be closed so that water does not flow from the hot-water pipe 61 to the heating supply pipe 81.

The controller 15 may control each component or device included in the heat pump 10 based on a sensing value of at least one sensor included in the sensor assembly 14. For example, The controller 15 may determine a function provided by the heat pump 10 based on a sensing value of the outdoor temperature sensor. When the sensing value of the outdoor temperature sensor is less than a predetermined temperature, the controller 15 may stop an operation of the compressor 120 so that the heat pump 10 does not provide the heating function. The predetermined temperature may be a temperature of outdoor air at which an efficiency of the heat pump 10 is significantly lowered (e.g. −7° C.).

An efficiency of the heat pump 10 may correspond to a coefficient of performance (COP). The controller 15 may drive the compressor 120 when the sensing value of the outdoor temperature sensor is equal to or greater than the predetermined temperature, and the controller 15 may calculate an expected capability of the heat pump 10 based on the sensing value of the outdoor temperature sensor. In this situation, the expected capability may mean an expected capability when only the heat pump 10 is operated at a specific outdoor temperature.

For example, based on data on the change in the capability of the heat pump 10 according to the change in outdoor temperature, the controller 15 may determine the expected capability of the heat pump 10 corresponding to the sensing value of the outdoor temperature sensor. As the data on the change in the capability of the heat pump 10 is based on the change in the outdoor temperature, the change in the outdoor temperature and the change in the capability of the heat pump 10 may have a linear relationship.

The controller 15 may calculate an expected power consumption of the heat pump 10. For example, based on the sensing value of the outdoor temperature sensor, an initial target temperature preset or predetermined in relation to the temperature of water supplied to the heating device 400, and/or the expected capability of the heat pump 10, the controller 15 may calculate the expected power consumption of the heat pump 10 according to a calculation formula such as Equation 1. In this situation, the initial target may be set according to a user input.

$$\text{Expected power consumption} = a + (b \times Tod) + (c \times Tw1) + (d \times COP) \quad \text{[Equation 1]}$$

In this situation, in Equation 1, Tod may be the sensing value of the outdoor temperature sensor, Tw1 may be an initial target temperature, COP may be the expected capability of the heat pump 10, and a, b, c, and d may be constants. As the outdoor temperature decreases, as the initial target temperature increases, and as the expected capability of the heat pump 10 increases, constants a, b, c, and d may be determined so that the expected power consumption is high.

The controller 15 may calculate an expected efficiency of the heat pump 10. The expected efficiency may mean an efficiency of the heat pump 10 when only the heat pump 10 is operated at a specific outdoor temperature. For example, the controller 15 may calculate a value obtained by dividing the expected capability of the heat pump 15 by the expected power consumption of the heat pump 15 as the expected efficiency of the heat pump 15.

The controller 15 may control the boiler 500 to power on or off. For example, the heat pump 10 may further include a component or device (e.g. a switch) that transmits a power signal to the boiler 500, and the controller 15 may transmit a signal to the component (e.g. a switch) to turn the boiler 500 on or off.

The controller 15 may control power to the boiler 500 based on the expected efficiency of the heat pump 10. For example, the controller 15 may control the boiler 500 to be turned off when the expected efficiency of the heat pump 10 is greater than or equal to a predetermined efficiency value. The predetermined efficiency value may be determined according to a ratio between an electric rate per unit of quantity of heat and a gas rate per unit of quantity of heat.

For example, when the electric rate per unit of quantity of heat is three times the gas rate per unit of quantity of heat, the predetermined efficiency value may be determined as 3. In this situation, when the expected efficiency of the heat pump 10 is 3 or more, it is efficient to operate only the heat pump 10, and the controller 15 may control the boiler 500 to be turned off and control only the heat pump 10 to operate.

When the expected efficiency of the heat pump 10 is less than the predetermined efficiency value, the controller 15 may control power on/off to the boiler 500 based on the sensing value of the heating temperature sensor 190. When the expected efficiency of the heat pump 10 is less than the predetermined efficiency value, the controller 15 may calculate a target temperature for the temperature of water flowing through the heating pipes.

For example, based on the expected efficiency, the temperature of the outdoor heat exchanger 140 and/or the sensing value of the cold-water pipe temperature sensor, the controller 15 may calculate the target temperature of the heat pump 10 according to a calculation formula such as Equation 2.

$$\text{Target Temperature} = \frac{COP \times (c + d \times Teva + e \times Tw2) + f \times Tw2}{a + b \times COP} \quad \text{[Equation 2]}$$

In Equation 2, Teva may be the temperature of the outdoor heat exchanger 140, Tw2 may be the sensing value of the cold-water pipe temperature sensor, COP may be the expected efficiency of the heat pump 10, and a, b, c, d, e, and f may be constants. The controller 15 may control power to the boiler 500 according to a result of comparing the target temperature with the sensing value of the heating temperature sensor 190, which may indicate the current temperature of water flowing through the heating pipes.

For example, the controller 15 may control the boiler 500 to be turned off when the sensing value of the heating temperature sensor 190 is higher than the target temperature, and control the boiler 500 to be turned on when the sensing value of the heating temperature sensor 190 is less than the target temperature. The controller 15 may control the boiler 500 to be turned on when a difference value obtained by subtracting the sensing value of the heating temperature sensor 190 from the target temperature is greater than or equal to a predetermined reference difference, and control the boiler 500 to be turned off when the difference value is less than the predetermined reference difference.

The controller 15 may control the boiler supply valve 187 to be closed so that water discharged from the boiler 500 does not flow to the heating supply pipe 81 through the boiler supply pipe 83 when the boiler 500 is turned off. For example, when the boiler 500 is turned off, the controller 15 may control zero pulse or no pulse to be input to the boiler supply valve 187 so that the boiler supply valve 187 is closed.

The controller 15 may control the degree to which the boiler supply valve 187 is opened when the boiler 500 is turned on while the compressor 120 of the heat pump 10 is operating. The controller 15 may control the degree to which the boiler supply valve 187 is opened according to a difference between the sensing value of the heating temperature sensor 190 and the target temperature.

For example, when the difference value obtained by subtracting the sensing value of the heating temperature sensor 190 from the target temperature is less than 1° C., the controller 15 may control the degree to which the boiler supply valve 187 is opened to be maintained. When the difference value obtained by subtracting the sensing value of the heating temperature sensor 190 from the target temperature is 1° C. or more and less than 2° C., the controller 15 may control the pulse value input to the boiler supply valve 187 to increase by one pulse, so that the degree or amount of time that the boiler supply valve 187 is opened is increased by a degree value of 1 from the present or current degree. A degree value may correspond to an opening amount or an overall opening time of the boiler supply valve 187. When the difference value obtained by subtracting the sensing value of the heating temperature sensor 190 from the target temperature is 2° C. or more, the controller 15 may control the pulse value input to the boiler supply valve 187 to increase by two pulses, so that the degree to which the boiler supply valve 187 is opened is increased by two from the current value. When the difference value obtained by subtracting the sensing value of the heating temperature sensor 190 from the target temperature is −2° C. or more and less than −1° C., the controller 15 may control the pulse value input to the boiler supply valve 187 to decrease by one pulse, so that the degree to which or time that the boiler supply valve 187 is opened is decreased by one from the current value.

The controller 15 may check the number of times the boiler 500 is turned on or off while the heat pump 10 is operating with the sensing value of the outdoor temperature sensor equal to or higher than the predetermined temperature. When the number of times the boiler 500 is turned on or off exceeds a predetermined number, the degree to which the boiler supply valve 187 is opened may be controlled.

Referring to FIG., the heat pump 10 may determine whether the outdoor temperature is equal to or higher than the predetermined temperature (step S410). For example, the heat pump 10 may determine whether the sensing value of the outdoor temperature sensor is equal to or higher than the predetermined temperature (e.g. −7° C.) at which the efficiency of the heat pump 10 is lowered.

When the outdoor temperature is equal to or higher than the predetermined temperature ("Yes" in step S410), the heat pump 10 may calculate the expected efficiency of the heat pump 10 (step S420). For example, the heat pump 10 may calculate the expected capability of the heat pump 10 based on the sensing value of the outdoor temperature sensor and calculate the expected power consumption of the heat pump 10 based on the sensing value of the outdoor temperature sensor, the initial target temperature, and the expected capability of the heat pump 10. In this situation, the heat pump 10 may calculate the expected efficiency of the heat pump 10 by dividing the expected capability of the heat pump 15 by the expected power consumption of the heat pump 15.

The heat pump 10 may determine whether the expected efficiency of the heat pump 10 is greater than or equal to the predetermined efficiency value (step S430). The predetermined efficiency value may be determined according to a ratio between an electric rate per unit of quantity of heat and a gas rate per unit of quantity of heat.

When the expected efficiency of the heat pump 10 is greater than or equal to the predetermined efficiency value ("Yes" in step S430), the heat pump 10 may control the boiler 500 to be turned off (step S440). When the boiler 500 is already turned off, the heat pump 10 may control the boiler 500 to be continuously turned off.

Figure 6:
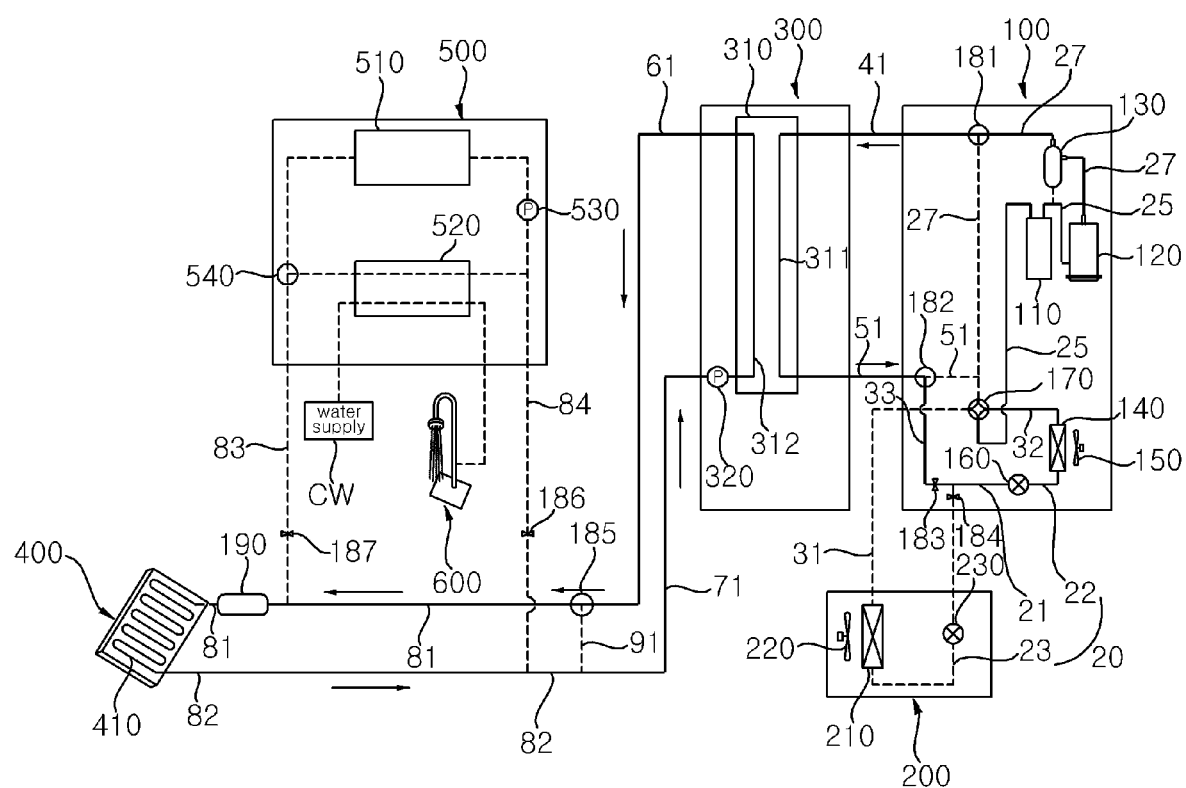
FIGS. 6 to 9B are views referred to for explanation of a method of operating a heat pump.

Referring to FIG. 6, when the outdoor temperature is higher than the reference temperature, the heat pump 10 may control the boiler 500 to be turned off so that the boiler 500 does not provide the heating function or operate to heat the indoor space. The heat pump 10 may drive the compressor 120 so that the refrigerant is compressed in order to heat the indoor space, and control the refrigerant control valve 181 so that the refrigerant compressed by the compressor 120 is supplied to the water-refrigerant heat exchanger 310 of the heat exchange device 300.

Water flowing through the water passage 312 of the water-refrigerant heat exchanger 310 may be heated due to heat exchange with the refrigerant flowing through the refrigerant passage 311 of the water-refrigerant heat exchanger 310, and the heated water may flow to the heating device 400 through the hot-water pipe 61 and the heating supply pipe 81. The heat pump 10 may control the hot water supply control valve 185 to be opened so that water flows from the hot water pipe 61 to the heating supply pipe 81.

The heat pump 10 may control the boiler supply valve 187 to be closed so that water discharged from the boiler 500 does not flow to the heating supply pipe 81 through the boiler supply pipe 83. In addition, the heat pump 10 may control the boiler return valve 186 to be closed so that water discharged from the heating device 400 to the heating recovery pipe 82 is not supplied to the boiler 500.

Figure 4:
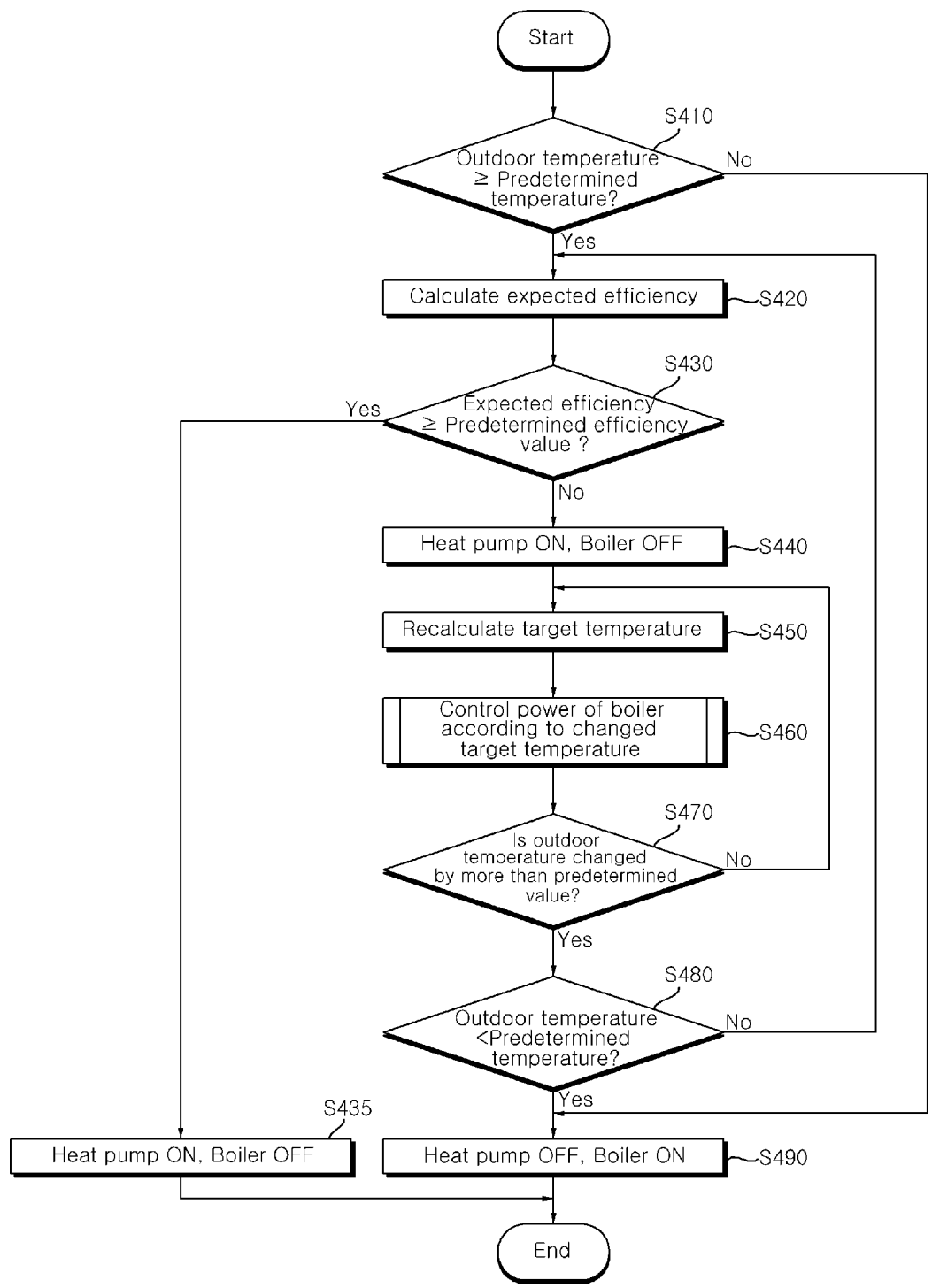
FIGS. 4, 5A, and 5B are flowcharts illustrating a method of operating a heat pump according to an embodiment of the present disclosure.

Referring to back FIG. 4, when the expected efficiency of the heat pump 10 is less than the predetermined efficiency value ("No" in step S430), the heat pump 10 may control the boiler 500 to be turned off (step S440). In addition, the heat pump 10 may control the operation of each component included in the heat pump 10 (step S440) and calculate the target temperature of the heat pump 10 (step S450). For example, as in Equation 2 above, the heat pump 10 may calculate the target temperature of the heat pump 10 based on the expected efficiency of the heat pump 10, the temperature of the outdoor heat exchanger 140, and the sensing value of the cold-water pipe temperature sensor.

Figure 5A:
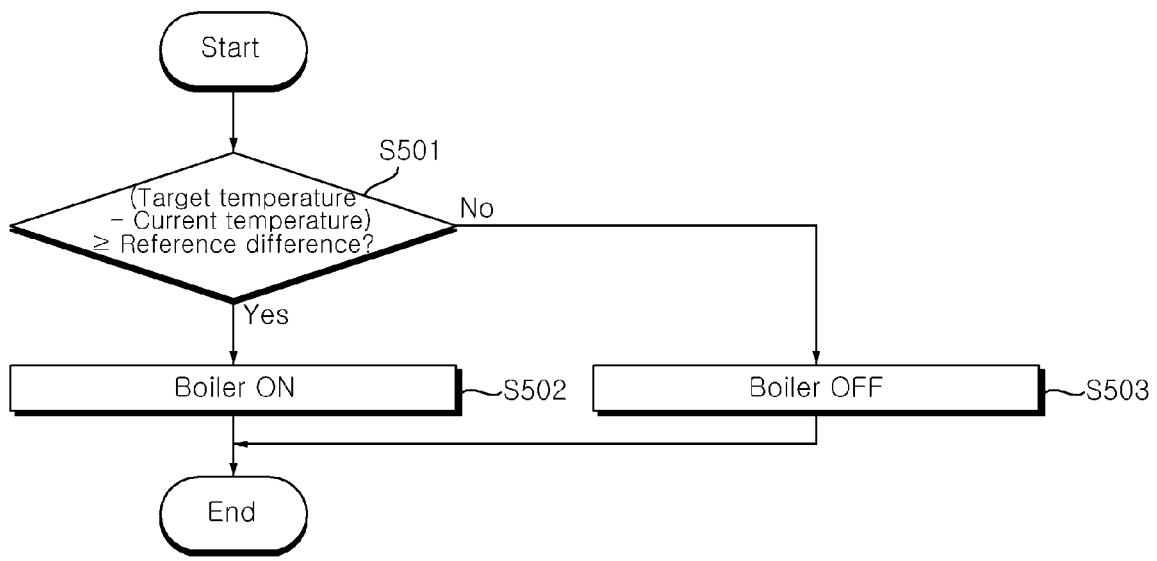

The heat pump 10 may control power on/off of the boiler 500 according to a result of comparing the target temperature with the sensing value of the heating temperature sensor 190, which may indicate the temperature of water flowing through the heating pipes (step S460). Referring to FIG. 5A, the heat pump 10 may determine whether a difference between the target temperature and a sensing value of the heating temperature sensor 190, indicating a current temperature of water flowing through the heating pipes, is equal to or greater than a predetermined reference difference (e.g. 2° C.) (step S501). The difference may be calculated by subtracting the sensing value of the heating temperature sensor 190 from the target temperature.

When the difference between the target temperature and the sensing value of the heating temperature sensor 190 is equal to or greater than the predetermined reference difference (e.g. 2° C.) ("Yes" in step S501), the heat pump 10 may control the boiler 500 to be turned on (step S502).

The heat pump 10 may control the boiler return valve 186 and the boiler supply valve 187 to be opened so that water discharged from the heating device 400 to the heating recovery pipe 82 flows to the boiler 500, and water heated in the boiler 500 flows to the heating supply pipe 81 through the boiler supply pipe 83. The heat pump 10 may control the boiler supply valve 187 to be opened by a predetermined pulse value so that water heated in the boiler 500 flows to the heating supply pipe 81 through the boiler supply pipe 83 as much as a predetermined amount.

Figure 7:
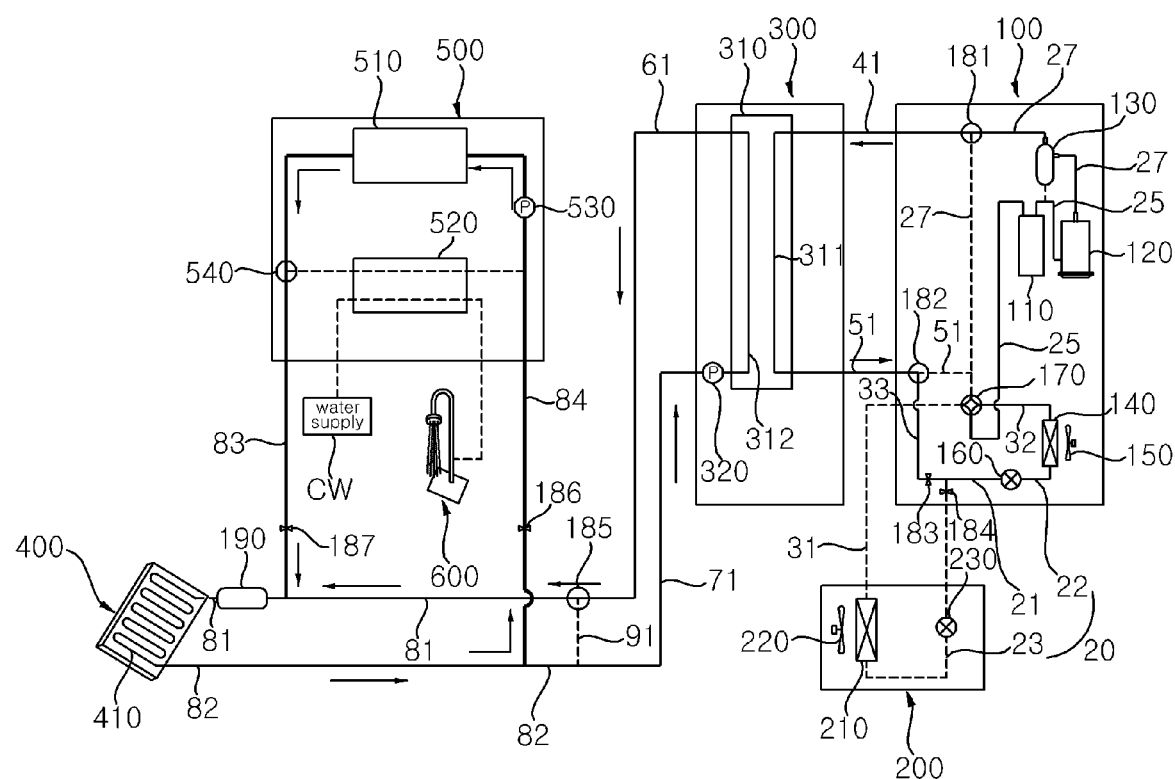

Referring to FIG. 7, the heat pump 10 may control the boiler return valve 186 to be opened so that water discharged from the heating device 400 to the heating recovery pipe 82 flows to the boiler 500 when the boiler 500 is turned on. The heat pump 10 may control the boiler supply valve 187 to be opened so that water heated in the boiler 500 flows to the heating supply pipe 81 through the boiler supply pipe 83. An opening degree, or a degree which the boiler supply valve 187 may be opened, may be controlled according to the difference between the target temperature and the sensing value of the heating temperature sensor 190.

The heat pump 10 may control an operation of each component included in the heat pump 10 according to the difference between the target temperature and the sensing value of the heating temperature sensor 190. For example, the heat pump 10 may change an operating frequency of the compressor 120 according to the difference between the target temperature and the sensing value of the heating temperature sensor 190.

Referring back to FIG. 5A, when the difference value obtained by subtracting the sensing value of the heating temperature sensor 190 from the target temperature is less than the predetermined reference difference (e.g. 2° C.) ("No" in step S501), the heat pump 10 may control the boiler 500 to be turned off (step S503). The heat pump 10 may control the boiler return valve 186 and the boiler supply valve 187 to be closed so that the flow of water flowing from the boiler 500 to the heating supply pipe 81 and the flow of water flowing from the heating recovery pipe 82 to the boiler 500 are blocked or impeded.

Figure 5B:
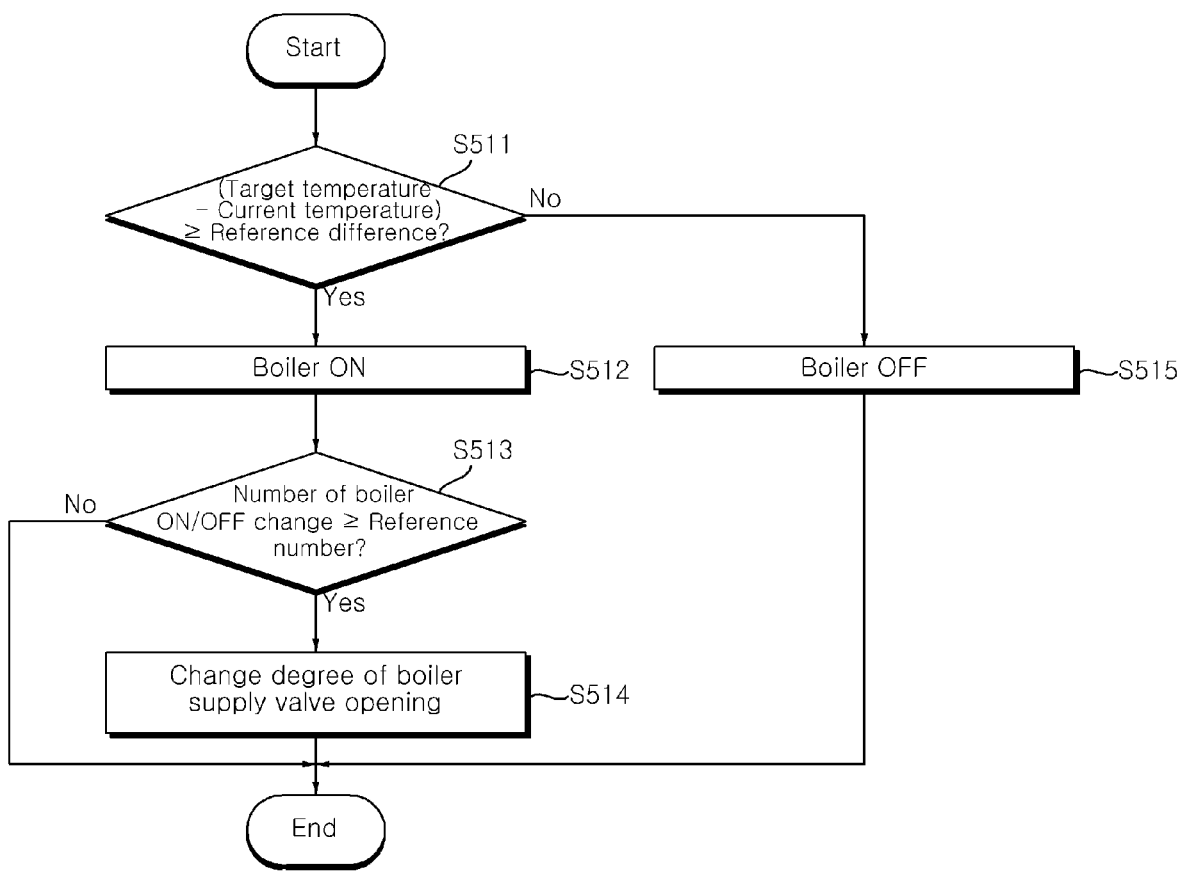

The heat pump 10 may control a degree to which the boiler supply valve 187 is opened based on the number of times the boiler 500 is turned on and/or off. Referring to FIG. 5B, the heat pump 10 may determine whether the difference between the target temperature and the sensing value of the heating temperature sensor 190 and the target temperature is equal to or greater than the predetermined reference difference (e.g. 2° C.) (step S511).

When the difference between the target temperature and the sensing value of the heating temperature sensor 190 is equal to or greater than the predetermined reference difference (e.g. 2° C.) ("Yes" in step S511), the heat pump 10 may control the boiler 500 to be turned on (step S512). While the heat pump 10 is operating with the sensing value of the outdoor temperature sensor equal to or higher than the predetermined temperature, the heat pump 10 may determine whether a number of times the boiler 500 is turned on and/or off exceeds a predetermined reference number (e.g. 5 times) (step S513).

When the number of times the boiler 500 is turned on and/or off exceeds the predetermined reference number (e.g. 5 times) ("Yes" in step S513), the heat pump 10 may control the degree to which the boiler supply valve 187 is opened according to the difference between the target temperature and the sensing value of the heating temperature sensor 190 (step S514). When the difference between the target temperature and the sensing value of the heating temperature sensor 190 is less than the predetermined reference difference (e.g. 2° C.) ("No" in step S511), the heat pump 10 may control the boiler 500 to be turned off (step S515).

Referring back to FIG. 4, the heat pump 10 may determine whether the outdoor temperature is changed by more than a predetermined value (step S470). For example, the heat pump 10 may determine whether the sensing value of the outdoor temperature sensor is changed by 1° C. or more. When the outdoor temperature is not changed by more than the predetermined value ("No" in step S470), the heat pump 10 may control power on or off to the boiler 500 by calculating the target temperature of the heat pump 10 (step S450). When the outdoor temperature is changed by more than the predetermined value ("Yes" in step S470), the heat pump 10 may determine again whether the outdoor temperature is equal to or higher than the predetermined temperature (e.g. −7° C.) (step S480).

When the outdoor temperature is still higher than the predetermined temperature (e.g., −7° C.) ("No" in step S480), the heat pump 10 may recalculate the expected efficiency of the heat pump 10 in step S420. When the outdoor temperature is less than the predetermined temperature (e.g. −7° C.), indicating that the expected efficiency of the heat pump 10 may be or is likely to be lowered, ("Yes" in step S480), the heat pump 10 may control the boiler 500 to be turned on, and control the operation of each component included in the heat pump 10 so that the operation of the heat pump 10 is stopped (step S490).

Figure 8:
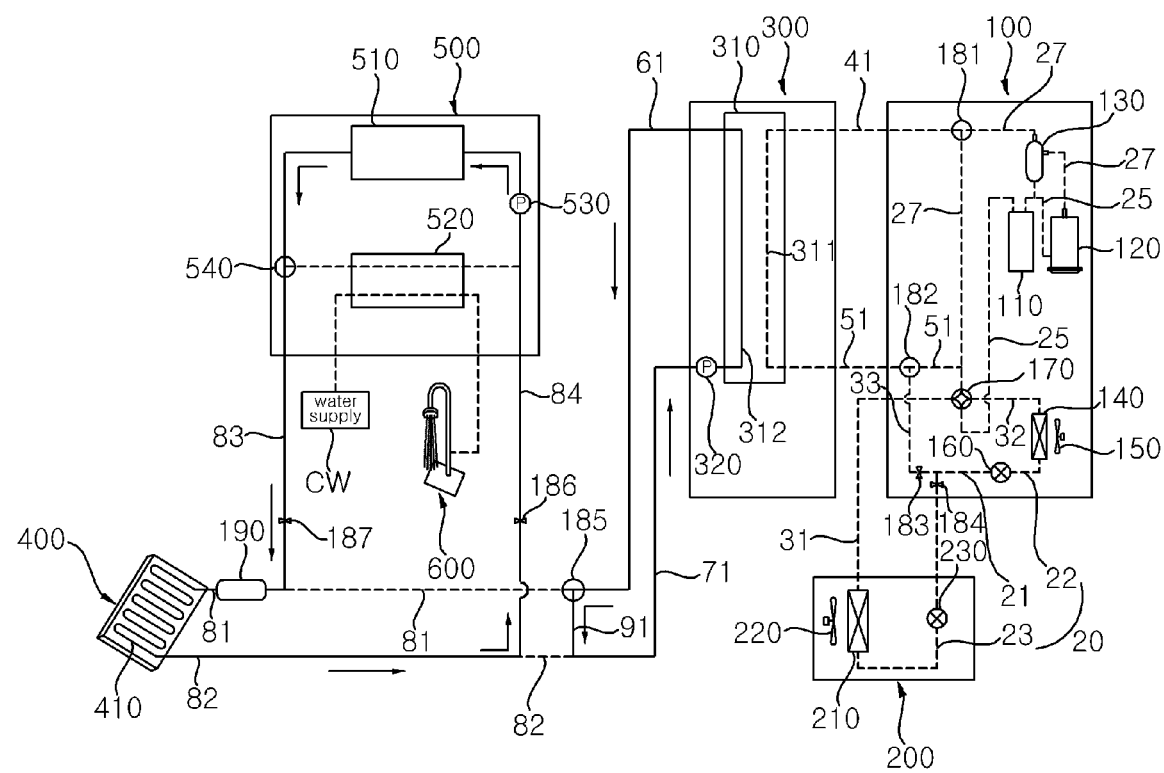

Referring to FIG. 8, when the boiler 500 is turned on because the outdoor temperature is less than the predetermined temperature, the heat pump 10, via controller 15, may stop the compressor 120 and control the refrigerant control valve 181 so that the refrigerant compressed by the compressor 120 is not supplied to the water-refrigerant heat exchanger 310 of the heat exchange device 300. The heat pump 10, via controller 15, may control the hot water supply control valve 185 to be closed so that water flowing in the hot-water pipe 61 does not flow to the heating supply pipe 81 but may flow through the bypass pipe 91 to the cold-water pipe 71.

In addition, the heat pump 10 may control the boiler return valve 186 and the boiler supply valve 187 to be opened so that water discharged from the heating device 400 to the heating recovery pipe 82 may flow to the boiler 500, and water heated in the boiler 500 may flow to the heating supply pipe 81 through the boiler supply pipe 83. Even when the heat pump 10 stops providing the heating function that heats an indoor space and/or indoor air, the recovery pump 320 may operate to circulate water through the water refrigerant heat exchanger 310 to prevent freezing.

Figure 9A:
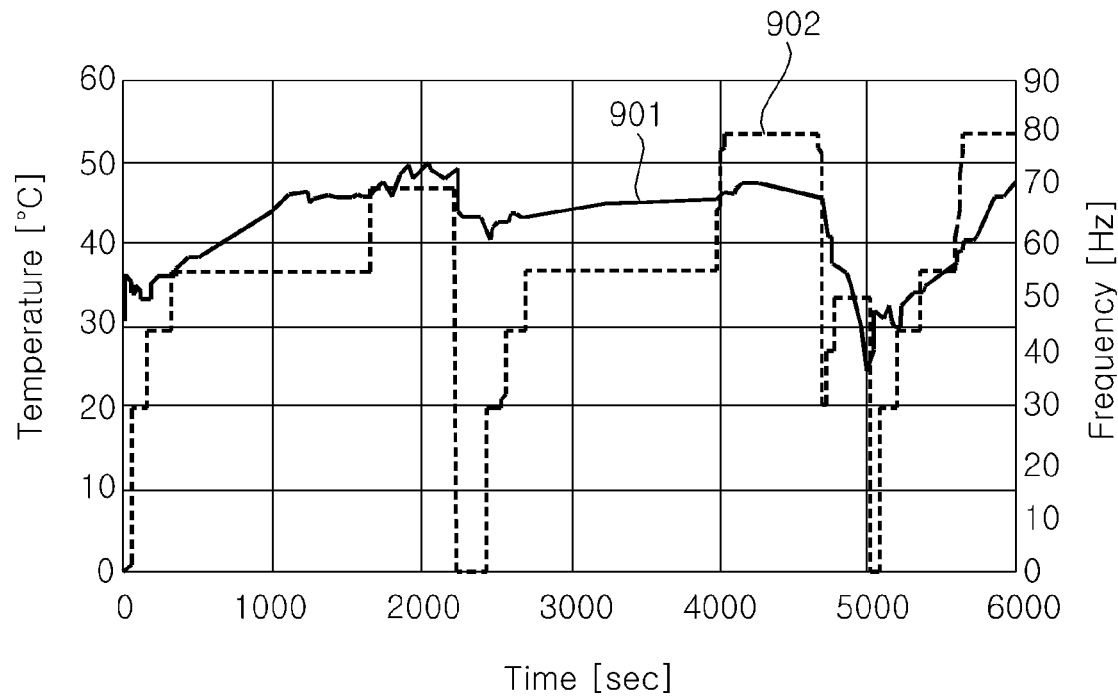
Figure 9B:
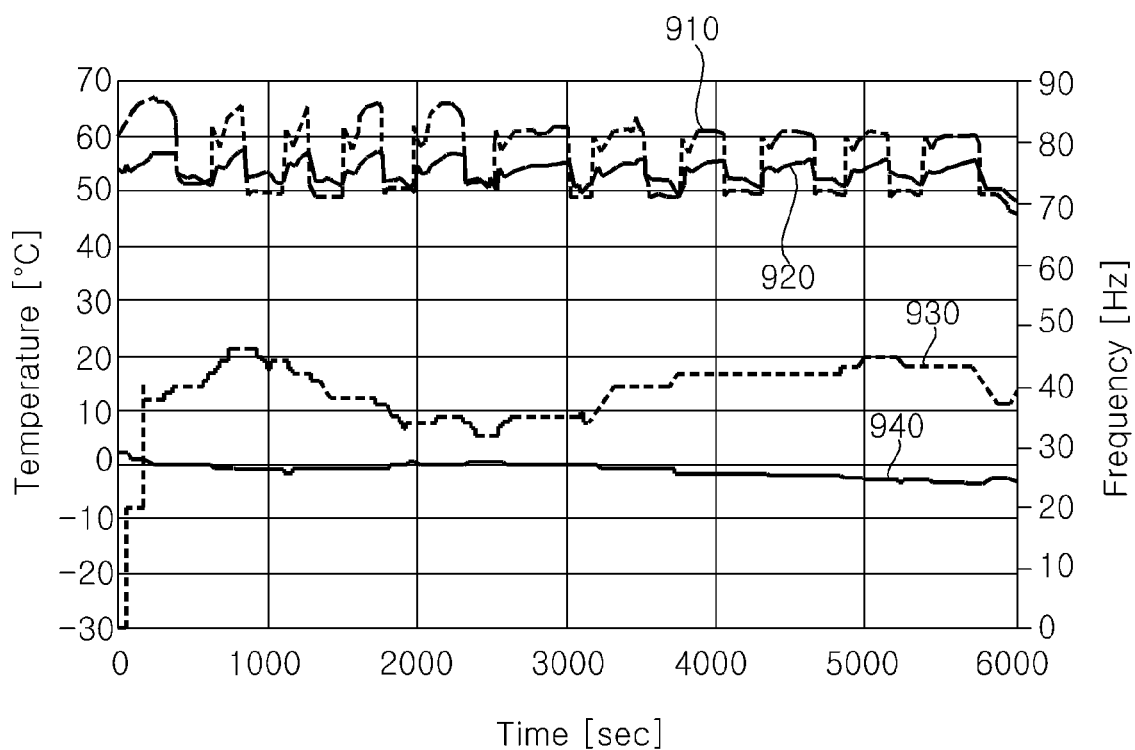

Referring to FIG. 9A, the operating frequency 902 of the compressor 120 may be rapidly adjusted according to a temperature 901 of the water supplied to the heating device 400 and the target temperature, and the temperature 901 of the water supplied to the heating device 400 does not reach the specific target temperature (e.g. 52° C.). Referring to FIG. 9B, as the boiler 500 and the boiler supply valve 187 are repeatedly opened and closed according to the efficiency of the heat pump 10, the temperature 910 of water flowing through a portion of the boiler supply pipe 83 is also repeatedly increased and decreased. The sensing value of the heating temperature sensor 190, which may indicate the temperature 920 of the water supplied to the heating device 400, is also repeatedly increased or decreased in response to a change in the temperature 910 of water flowing through a portion of the boiler supply pipe 83.

Referring to FIGS. 9A and 9B, in the case of operating only the heat pump 10 when the boiler 500 is powered off, compared to the case in which the boiler 500 is turned on and off depending on the efficiency of the heat pump 10, the operating frequency 902 of the compressor 120 may be rapidly changed, and a maximum operating frequency may be remarkably high. In the case of operating only the heat pump 10 when the boiler 500 is powered off, it may be difficult for the temperature 901 of water supplied to the heating device 400 to reach the specific target temperature (e.g. 52° C.) due to a decrease in the efficiency of the heat pump 10. In the case where the boiler 500 is turned on/off depending on the efficiency of the heat pump 10, the temperature 920 of water supplied to the heating device 400 may be maintained at a higher temperature.

A cost to heat an indoor space or to supply hot water may be reduced or minimized by controlling the boiler 500 to be turned on in consideration of the efficiency of the heat pump 10 and the electric rate and the gas rate, even when the outdoor temperature is higher than a predetermined temperature.

Embodiments disclosed herein may provide a heat pump and a method of controlling a heat pump such that, when an outdoor temperature is higher than a predetermined temperature and a boiler 500 is turned on according to an efficiency of the heat pump 10, a temperature of water flowing through heating pipes may be prevented or impaired from rapidly increasing by controlling an amount of water discharged from the boiler 500 according to the temperature of water flowing through the heating pipes.

Embodiments disclosed herein may solve the above and other problems. Embodiments disclosed herein may provide a heat pump that may control power of or to the boiler according to an efficiency of the heat pump calculated based on data for each component of the heat pump when the outdoor temperature is higher than a predetermined temperature. Embodiments disclosed herein may provide a heat pump that controls an amount of fluid or water discharged from the boiler according to the temperature of water flowing through heating pipes when the outdoor temperature is higher than a predetermined temperature and the boiler is turned on according to the efficiency of the heat pump.

Embodiments disclosed herein may be implemented as a heat pump in including a compressor configured to compress a refrigerant, a first temperature sensor configured to detect an outdoor temperature, a second temperature sensor provided in heating pipes connected to a heating device to perform indoor heating and configured to detect a temperature of water flowing through the heating pipes, and a controller.

When a sensing value of the first temperature sensor is less than a reference temperature, the controller may be configured to control power of a boiler so that the boiler is turned on, and to control the compressor to be stopped. When a sensing value of the first temperature sensor is equal to or higher than a reference or predetermined temperature, the controller may be configured to calculate an expected efficiency of the heat pump based on the sensing value of the first temperature sensor and an initial target temperature preset or predetermined in relation to the temperature of water flowing through the heating pipes. When the expected efficiency is less than a predetermined reference value, the controller may be configured to control power of a boiler so that the boiler is turned off. When the expected efficiency is equal to or greater than the predetermined reference value, the controller may be configured to control the power of the boiler according to a sensing value of the second temperature sensor.

The controller may be configured to calculate an expected capability of the heat pump based on the sensing value of the first temperature sensor, calculate an expected power consumption of the heat pump based on an equation for the expected capability, the initial target temperature, and the sensing value of the first temperature sensor, and calculate a value obtained by dividing the expected capability by the expected power consumption as the expected efficiency. The predetermined reference value may be determined according to a ratio between an electric rate and a gas rate.

When the expected efficiency is less than the predetermined reference value, the controller may be configured to calculate a target temperature for the temperature of water flowing through the heating pipes based on the expected efficiency. When a difference value obtained by subtracting the sensing value of the second temperature sensor from the target temperature is greater than or equal to a predetermined reference difference, the controller may be configured to control the power of the boiler so that the boiler is turned on. When the difference value is less than to the predetermined reference difference, the controller may be configured to control the power of the boiler so that the boiler is turned off.

The heat pump may further comprise a heat exchange device configured to perform heat exchange between water and the refrigerant, a third temperature sensor configured to detect a temperature of water flowing into the heat exchange device, an outdoor heat exchanger configured to perform heat exchange between outdoor air and a refrigerant, and a fourth temperature sensor configured to detect a temperature of the outdoor heat exchanger. The controller may be configured to calculate the target temperature based on the expected efficiency, a sensing value of the third temperature sensor, and a sensing value of the fourth temperature sensor.

The controller may be configured to determine whether the sensing value of the first temperature sensor is changed by more than a predetermined value. When the sensing value of the first temperature sensor is changed by more than the predetermined value, the controller may be configured to recalculate the expected efficiency based on the sensing value of the first temperature sensor.

The heat pump may further comprise a valve provided in a boiler supply pipe through which water discharged from the boiler flows. When the boiler is turned on, open the valve, and when the boiler is turned off, the controller may be configured to close the valve.

While the expected efficiency is less than the predetermined reference value, the controller may be configured to check the number of times a state of the power of the boiler has changed. When the number of times the state of the power of the boiler has changed exceeds a predetermined reference number, the controller may be configured to control a degree to which the boiler supply valve is opened according to the difference between the sensing value of the second temperature sensor and the target temperature.

Embodiments disclosed herein may be implemented as a method of controlling a heat pump comprising, when a sensing value of a first temperature sensor detecting an outdoor temperature is less than a reference or predetermined temperature, controlling power of a boiler so that the boiler is turned on and controlling the compressor to be stopped; when the sensing value of the first temperature sensor is equal to or higher than the reference temperature, calculating an expected efficiency of the heat pump based on the sensing value of the first temperature sensor and an initial target temperature preset or predetermined in relation to the temperature of water flowing through a heating pipes connected to a heating device for performing indoor heating; when the expected efficiency is equal to or greater than a predetermined reference value, controlling the power of the boiler so that the boiler is turned off; and when the expected efficiency is less than the predetermined reference value, controlling the power of the boiler according to a sensing value of a second temperature sensor detecting a temperature of water flowing through the heating pipes.

The additional range of applicability of the present disclosure will become apparent from the detailed description. However, because various changes and modifications will be clearly understood by those skilled in the art within the spirit and scope of the present disclosure, it should be understood that the detailed description and specific embodiments such as preferred embodiments of the present disclosure are merely given by way of example.

Since the accompanying drawings are merely for easily understanding embodiments disclosed herein, it should be understood that the technical spirit disclosed herein is not limited by the accompanying drawings, and all changes, equivalents or substitutions are included in the spirit and technical scope of the present disclosure.

Likewise, although operations are shown in a specific order in the drawings, it should not be understood that the operations are performed in the specific order shown in the drawings or in a sequential order so as to obtain desirable results, or all operations shown in the drawings are performed. In certain cases, multitasking and parallel processing may be advantageous.

Although the present disclosure has been described with reference to specific embodiments shown in the drawings, it is apparent to those skilled in the art that the present description is not limited to those exemplary embodiments and is embodied in many forms without departing from the scope of the present disclosure, which is described in the following claims. These modifications should not be individually understood from the technical spirit or scope of the present disclosure.

In order to clearly and briefly describe the present disclosure, components that are irrelevant to the description will be omitted in the drawings. The same reference numerals are used throughout the drawings to designate the same or similar components.

Terms "module" and "part" for elements used in the following description are given simply in view of the ease of the description, and do not carry any important meaning or role. Therefore, the "module" and the "part" may be used interchangeably.

It should be understood that the terms "comprise", "include", "have", etc. when used in this specification, specify the presence of stated features, integers, steps, operations, elements, components, or combinations of them but do not preclude the presence or addition of one or more other features, integers, steps, operations, elements, components, or combinations thereof.

It will be understood that, although the terms "first", "second", etc. may be used herein to describe various elements, these elements should not be limited by these terms. These terms are only used to distinguish one element from another element.

Unless otherwise defined, all terms including technical and scientific terms used herein have the same meaning as commonly understood by one of ordinary skill in the art to which the present disclosure belongs. Further, terms defined in a common dictionary will not be interpreted in an idealized or overly formal sense unless expressly so defined herein.

In the drawings, the thicknesses or the sizes of elements and graphs may be exaggerated, omitted or simplified to more clearly and conveniently illustrate the present disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A heat pump, comprising:
   a compressor configured to compress a refrigerant;
   a first temperature sensor configured to detect an outdoor temperature;
   a second temperature sensor provided in at least one heating pipe connected to a heating device and configured to detect a temperature of fluid flowing through the at least one heating pipe; and
   a controller configured to:
   when a first sensed value of the first temperature sensor is less than a predetermined temperature, control power to a boiler such that the boiler is turned on, and control the compressor to stop operating,
   when the first sensed value is equal to or greater than the predetermined temperature, calculate an expected efficiency of the heat pump based on the first sensed value and an initial target temperature, which is predetermined based on a temperature of fluid flowing through the at least one heating pipe,
   when the expected efficiency is equal to or greater than a predetermined efficiency value, control power to the boiler such that the boiler is turned off, and
   when the expected efficiency is less than the predetermined efficiency value, calculate a target temperature for the temperature of fluid flowing through the at least one heating pipe for heating an indoor space based on the expected efficiency,
   when a second sensed value of the second temperature sensor is equal to or higher than the target temperature, control the power to the boiler such that the boiler is turned off, and
   when the second sensed value of the second temperature sensor is less than the target temperature, control the power to the boiler such that the boiler is turned on.

2. The heat pump of claim 1, wherein the heating device is in communication with the heat pump via the at least one heating pipe and is configured to heat an indoor floor.

3. The heat pump of claim 1, wherein the boiler is in communication with the heat pump via the at least one heating pipe.

4. The heat pump according to claim 1, wherein the controller is configured to:
calculate an expected capability of the heat pump based on the first sensed value;
calculate an expected power consumption of the heat pump based on the expected capability, the initial target temperature, and the first sensed value; and
calculate the expected efficiency by dividing the expected capability by the expected power consumption.

5. The heat pump according to claim 1, wherein the predetermined efficiency value is determined according to a ratio between an electric rate and a gas rate.

6. The heat pump according to claim 1, wherein, based on the second sensed value of the second temperature sensor being less than the target temperature, the controller is configured to:
when a difference value obtained by subtracting the second sensed value from the target temperature is greater than or equal to a predetermined difference, control the power to the boiler such that the boiler is turned on; and
when the difference value is less than the predetermined difference, control the power to the boiler such that the boiler is turned off.

7. The heat pump according to claim 1, further comprising:
a heat exchange device configured to perform heat exchange between fluid and the refrigerant;
a third temperature sensor configured to detect a temperature of fluid flowing into the heat exchange device;
an outdoor heat exchanger configured to perform heat exchange between outdoor air and the refrigerant; and
a fourth temperature sensor configured to detect a temperature of the outdoor heat exchanger, wherein the controller is configured to calculate the target temperature based on the expected efficiency, a third sensed value of the third temperature sensor, and a fourth sensed value of the fourth temperature sensor.

8. The heat pump according to claim 1, wherein the controller is configured to:
determine whether the first sensed value is changed by more than a predetermined value; and
when the first sensed value is changed by more than the predetermined value, recalculate the expected efficiency based on the first sensed value.

9. The heat pump according to claim 1, further comprising a valve provided in a boiler supply pipe through which fluid discharged from the boiler flows,
wherein, when the boiler is turned on, the controller is configured to open the valve, and when the boiler is turned off, the controller is configured to close the valve.

10. The heat pump according to claim 9, wherein the controller is configured to:
when the expected efficiency is less than the predetermined efficiency value, check a number of times a state of the power to the boiler has changed; and
when the number of times the state of the power to the boiler has changed exceeds a predetermined reference number, control a degree to which the valve is opened according to a difference value.

11. A method of controlling a heat pump, the method comprising:
calculating an expected efficiency of the heat pump based on a first sensed value of a first temperature sensor configured to detect an outdoor temperature and an initial target temperature, which is predetermined based on a temperature of fluid flowing through at least one heating pipe connected to a heating device configured to heat an indoor space, based on the first sensed value being equal to or greater than a predetermined temperature;
controlling power to a boiler such that the boiler is turned off, based on the expected efficiency being equal to or greater than a predetermined efficiency value;
calculating a target temperature for the temperature of fluid based on the expected efficiency being less than the predetermined efficiency value;
controlling the power to the boiler such that the boiler is turned off, based on a second sensed value of a second temperature sensor configured to detect the temperature of fluid being equal to or higher than the target temperature;
controlling the power to the boiler such that the boiler is turned on, based on the second sensed value of the second temperature sensor being less than the target temperature; and
controlling the power to the boiler such that the boiler is turned on and controlling a compressor of the heat pump to stop operating, based on the first sensed value being less than the predetermined temperature.

12. The method of claim 11, wherein the calculating of the expected efficiency comprises:
calculating an expected capability of the heat pump based on the first sensed value;
calculating an expected power consumption of the heat pump based on the expected capability, the initial target temperature, and the first sensed value; and
calculating the expected efficiency value by dividing the expected capability by the expected power consumption.

13. The method of claim 12, wherein the predetermined efficiency value is determined according to a ratio between an electric rate and a gas rate.

14. The method of claim 12, wherein the controlling of the power to the boiler based on the second sensed value of the second temperature sensor being less than the target temperature comprises:
controlling the power to the boiler such that the boiler is turned on, based on a difference value obtained by subtracting the second sensed value from the target temperature being greater than or equal to a predetermined difference; and
controlling the power to the boiler such that the boiler is turned off, based on the difference value being less than the predetermined difference.

15. The method of claim 11, wherein the calculating of the target temperature comprises calculating the target temperature based on the expected efficiency, a third sensed value of a third temperature sensor and a fourth sensed value of a fourth temperature sensor, the third temperature sensor being configured to detect a temperature of fluid flowing into a heat exchange device configured to perform heat exchange between fluid and a refrigerant, and the fourth temperature sensor being configured to detect a temperature of an outdoor heat exchanger configured to perform heat exchange between outdoor air and the refrigerant.

16. The method of claim 11, further comprising:
determining whether the first sensed value is changed by more than a predetermined value; and recalculating the expected efficiency based on the first sensed value being changed by more than the predetermined value.

17. The method of claim 11, further comprising:
opening a valve provided in a boiler supply pipe through which fluid discharged from the boiler flows, based on the boiler being turned on; and
closing the valve, based on the boiler being turned off.

18. The method of claim 17, further comprising:
checking a number of times a state of the power to the boiler has changed, based on the expected efficiency being less than the predetermined efficiency value; and
controlling a degree to which the valve is opened according to a difference value, based on the number of times the state of the power to the boiler has changed exceeding a predetermined reference number.

19. A heating system, comprising:
a boiler having a combustion heating device;
a heating device configured to heat an indoor space; and
a heat pump, including:
   a compressor configured to compress a refrigerant;
   at least one heating pipe configured to connect to the heating device;
   a first temperature sensor configured to detect an outdoor temperature;
   a second temperature sensor provided in the at least one heating pipe to detect a temperature of fluid flowing through the at least one heating pipe;
   an outdoor heat exchanger configured to perform heat exchange between outdoor air and the refrigerant; and
   a controller configured to receive information from the first and second temperature sensors, and to control power to the boiler and to control the compressor based on the information received from the first and second temperature sensors, wherein:
      when a first sensed value of the first temperature sensor is equal to or greater than a first predetermined temperature, an expected efficiency of the heat pump is calculated based on the first sensed value and an initial target temperature of fluid flowing through the at least one heating pipe,
      when the expected efficiency is equal to or greater than a predetermined efficiency value, the boiler is turned off,
      when the expected efficiency is less than the predetermined efficiency value, a target temperature for the temperature of fluid is calculated based on the expected efficiency,
      when a second sensed value of the second temperature sensor is equal to or higher than the target temperature, the boiler is turned off, and
      when the second sensed value of the second temperature sensor is less than the target temperature, the boiler is turned on.

20. The heating system of claim 19, wherein the predetermined efficiency value is based on a ratio between an electric rate and a gas rate, and the expected efficiency is calculated by dividing an expected capability by an expected power consumption, the expected capability being based on the first sensed value, and the expected power consumption being based on the expected capability, the initial target temperature, and the first sensed value.

* * * * *